United States Patent [19]
Bassinger

[11] Patent Number: 5,636,688
[45] Date of Patent: Jun. 10, 1997

[54] SELF ALIGNING STUFFING BOX FOR PUMPJACK UNITS

[76] Inventor: Grey Bassinger, 6977 E. Commerce St., Odessa, Tex. 79760

[21] Appl. No.: 512,283

[22] Filed: Aug. 8, 1995

Related U.S. Application Data

[63] Continuation-in-part of Ser. No. 300,282, Sep. 2, 1994, Pat. No. 5,538,080, which is a continuation-in-part of Ser. No. 942,897, Sep. 10, 1992, Pat. No. 5,343,944.

[51] Int. Cl.$^6$ ........................................ E21B 33/03
[52] U.S. Cl. ..................... 166/84.4; 166/176; 277/30
[58] Field of Search ................. 166/72, 84.1, 84.4, 166/170, 176; 251/1.1, 1.2; 277/2, 15, 30; 417/390

[56] References Cited

U.S. PATENT DOCUMENTS

| | | | |
|---|---|---|---|
| 1,911,670 | 5/1933 | Black . | |
| 1,947,198 | 2/1934 | Goble | 286/16 |
| 2,069,443 | 2/1937 | Hill | 286/15 |
| 2,159,306 | 5/1939 | Winters | 286/15 |
| 2,179,814 | 11/1939 | Conaghan | 166/14 |
| 2,182,246 | 12/1939 | Boyer et al. | 286/15 |
| 2,219,064 | 10/1940 | Boyer et al. | 286/15 |
| 2,721,748 | 10/1955 | Tremolada | 286/15 |
| 3,244,424 | 4/1966 | Cope | 277/4 |
| 3,512,787 | 5/1970 | Kennety et al. | 277/4 |
| 3,675,933 | 7/1972 | Nappe | 277/9 |
| 3,722,894 | 3/1973 | Cameron-Johnson | 277/9 |
| 3,886,804 | 6/1975 | Winfield, Jr. | 74/18.2 |
| 3,887,196 | 6/1975 | Renfrow | 277/2 |
| 4,008,897 | 2/1977 | Wentworth | 277/9 |
| 4,320,799 | 3/1982 | Gilbertson | 166/68 |
| 4,345,766 | 8/1982 | Turanyi | 277/30 |
| 4,490,097 | 12/1984 | Gilbertson | 417/401 |
| 4,560,176 | 12/1985 | Hoff | 277/105 |
| 5,343,944 | 9/1994 | Bassingers | 166/84 |

*Primary Examiner*—Frank Tsay
*Attorney, Agent, or Firm*—Akin, Gump, Strauss, Hauer & Feld, L.L.P.

[57] ABSTRACT

A self aligning stuffing box for a pumpjack unit of the type having a polished rod reciprocatingly extending therethrough and downhole to a pump located at the lower end of a borehole. The stuffing box has a main body that terminates in a tubing adaptor at the lower end thereof by which it can be mounted to the upper end of the tubing of a wellhead. The main body has an annular seal assembly that includes a pressure set seal pack for sealingly engaging the polished rod. The polished rod reciprocatingly extends through the seal assembly and main body. The seal assembly moves within the main body radially of the passageway to align the polished rod with the production tubing of the wellhead. A lower end of the seal assembly includes a compression piston which is moved in proportion to the well tubing pressure, and thereby compresses the seal of the seal pack so that the seal pack is always properly adjusted.

19 Claims, 6 Drawing Sheets

5,636,688

SELF ALIGNING STUFFING BOX FOR PUMPJACK UNITS

This patent application is a continuation-in-part of patent application Ser. No. 08/300,282 filed Sep. 2, 1994, now U.S. Pat. No. 5,538,080, issued Jul. 23, 1996, which in turn is a continuation-in-part of patent application Ser. No. 07/942,897 filed Sep. 10, 1992, now U.S. Pat. No. 5,343,944 issued Sep. 6, 1994 to which reference is made for further background of this invention.

BACKGROUND OF THE INVENTION

The present invention provides a stuffing box having the self aligning features found in my previous patents, and further includes the improved design of a pressure active seal assembly which adds unexpected long life to the seals thereof as well as affording a unique means of seal adjustment heretofore unknown to those skilled in the art.

In my previous Patent, when pressure set seals are employed, as the rod is reciprocated within the stuffing box, ambient pressure is effected against the uppermost seal of the pack while the lube oil chamber pressure is effected against the lowermost seal pack thereof. Where pressure set seals are employed, the lips of the seals are always set such that the lube oil is wiped from the rod surface on the upstroke with the residual lube oil providing the proper desired amount of lubricant on the downstroke, and this action results in elongated seal life.

Hydraulically set seals, also referred to as pressure set seals, are quite different from compression set seals; namely, the former are not adjusted after installation and therefore changing the seal chamber depth does not improve its seal characteristics, while changing the seal chamber depth of the latter greatly improves its seal characteristics.

Consequently, in my previous inventions, it was found advantageous to employ dual seal packs wherein an upper seal is pressure set while the lower seal is compression set. Accordingly, as the lower compression set seal pack wears, it was desirable to be able to periodically adjust the worn lower seal pack without having to disturb or adjust the upper hydraulic set seal pack, which until now has been captured in an optimunly adjusted manner.

In my previous invention, the tubing pressure on high pressure wells that employ pumpjack units can reach 1000 pounds per square inch, which presents several problems. A major problem is the pressure differential effected across the seal assembly forcing the lower seal flange to be lifted or moved uphole and thereby allowing production fluid to flow into the oil reservoir, thus depleting the lubrication supply. Another problem that sometime occurs in high pressure wells is the great torque required to tighten the closure member of the box against the upthrust of the tubing pressure under these operative conditions. Further, there is a problem of selecting the proper torque value for the closure member in order to properly space out the seal assembly components respective to a satisfactory sealed engagement with respect to the stuffing box roof and floor. These and other problems are overcome by the present invention which uses the pressure differential across the seal assembly to great advantage.

In the various embodiments of this invention, either of a pressure set or compression set seal means can be used advantageously, or a combination thereof, the seal pack of the seal assembly. Therefore, many unforeseen advantages are realized when either a pressure set or a compression set seal pack is employed in accordance with the present invention. In this instance, the compressive force presented by the well tubing pressure is exerted on the seal pack on both the upstroke and downstroke of the pumpjack unit, and as long as the proper compressive forces are effected across the opposed faces of the seal pack, the stuffing box will enjoy an unusually long life, and the seal pack will prevent contamination of the environment for a longer time interval before the seal pack fails. Such a desirable improvement is the subject of this invention.

SUMMARY OF THE INVENTION

A self aligning stuffing box has an improved seal assembly contained therewithin that is pressure set by employment of the pressure drop that is effected across the seal assembly, that is, the pressure differential measured between ambient and the tubing or upstream pressure to which the box is attached.

In several embodiments of this invention, the closure member and main body of the stuffing box jointly form a chamber within the box. The chamber receives the improved seal assembly therewithin; and, the main body, closure member, and seal assembly cooperate in sealed relationship respective to one another to form a sealed passageway through the box and seal assembly that receives a shaft, such as a polished rod, in sealed relationship therewith. The seal assembly is arranged for radial movement within the chamber in a manner such that the passageway of the stuffing box can be moved eccentrically in any radial direction within a plane that lays perpendicular to the polished rod to thereby accommodate misalignment between a pumpjack horsehead and the vertical axis of a borehole, for example. The unique seal assembly of this invention utilizes a seal pack that contains commercially available seal elements mounted within a seal holder thereof.

The self aligning features of the stuffing box in combination with the novel pressure set seal assembly elongates the expected life of the components that make up the improved stuffing box, and also afford means by which an appropriate relative compressive pressure can be effected on the seal pack thereof. This is achieved by the provision of a lower seal fixture having a seal piston which can be moved axially to change the compression on a seal pack. This unusual feature of the invention allows the incorporation into the seal assembly of a compression set or a pressure set seal pack, from which unexpected useful and desirable results are obtained.

A primary object of this invention is the provision of an improved stuffing box for a pumpjack unit, or the like, having a seal assembly mounted within a main body thereof. There is a seal pack included within the seal assembly which is supported within a seal holder therefor. An oil reservoir is formed within the main body and outwardly of the seal assembly and provides lubricant to the seal pack. The seal assembly includes a lower fixture that includes a piston-like member associated therewith which is moved axially in response to the magnitude of the tubing pressure of the well to change the compression effected on the seal pack and thereby continuously adjust the force of compression imparted to the seal in proportion to the magnitude of the tubing pressure.

Another object of this invention is the provision of a self aligning stuffing box having an oil reservoir formed within the main body thereof and outwardly of a seal assembly contained therewithin. The stuffing box can be supported from the tubing string of a well. Passageways connected to the oil reservoir provide a supply of lubricant to the seal

3 assembly, which is arranged for radial movement within the oil reservoir in a manner such that the seal assembly of the stuffing box can be moved eccentrically in any radial direction within a plane that lays perpendicular to the polished rod to thereby accommodate misalignment between a pumpjack horsehead and the vertical axis of a borehole. The seal assembly includes a seal pack and a fixture that is associated with a seal piston which is arranged to be moved axially in response to the value of the tubing pressure of the well in a manner to compress the seal pack and thereby continuously adjust the force of compression effected on the seal pack in proportion to the magnitude of the tubing pressure. This novel arrangement elongates the expected life of the seal assembly and enables the appropriate relative pressure to be effected on the seal pack thereof.

A still further object of this invention is to provide a self aligning stuffing box having a seal assembly that provides a rod passageway therethrough and seals the polished rod from the tubing pressure and from ambient. The seal assembly includes a seal holder which has a seal pack therein and which is mounted within axially aligned opposed fixtures; with means being provided by which the fixtures move laterally of the stuffing box to align the seal assembly with the horsehead of the pumpjack unit and with the tubing string of the borehole. Further, means are provided by which one of the fixtures includes a piston which is moved axially within a cylinder therefor to continuously apply a compression force on opposed faces of the seal pack in proportion to the tubing pressure.

Still another object of this invention is to disclose and provide a self aligning stuffing box that can be mounted to receive a moving shaft therethrough, and having a seal assembly including mounting fixtures and a seal holder within which a seal pack is captured, and further includes means responsive to upstream pressure for moving a piston associated with one of the seal mounting fixtures axially towards the other fixture and into engagement with the seal pack whereupon the sealed operating condition of the seal pack is maintained at an optimum value. Further, adjustment of an upper seal mounting fixture is achieved by axially changing the location of the upper seal mounting fixture without interrupting the operation of the moving shaft.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described herein.

4

Figure 5:
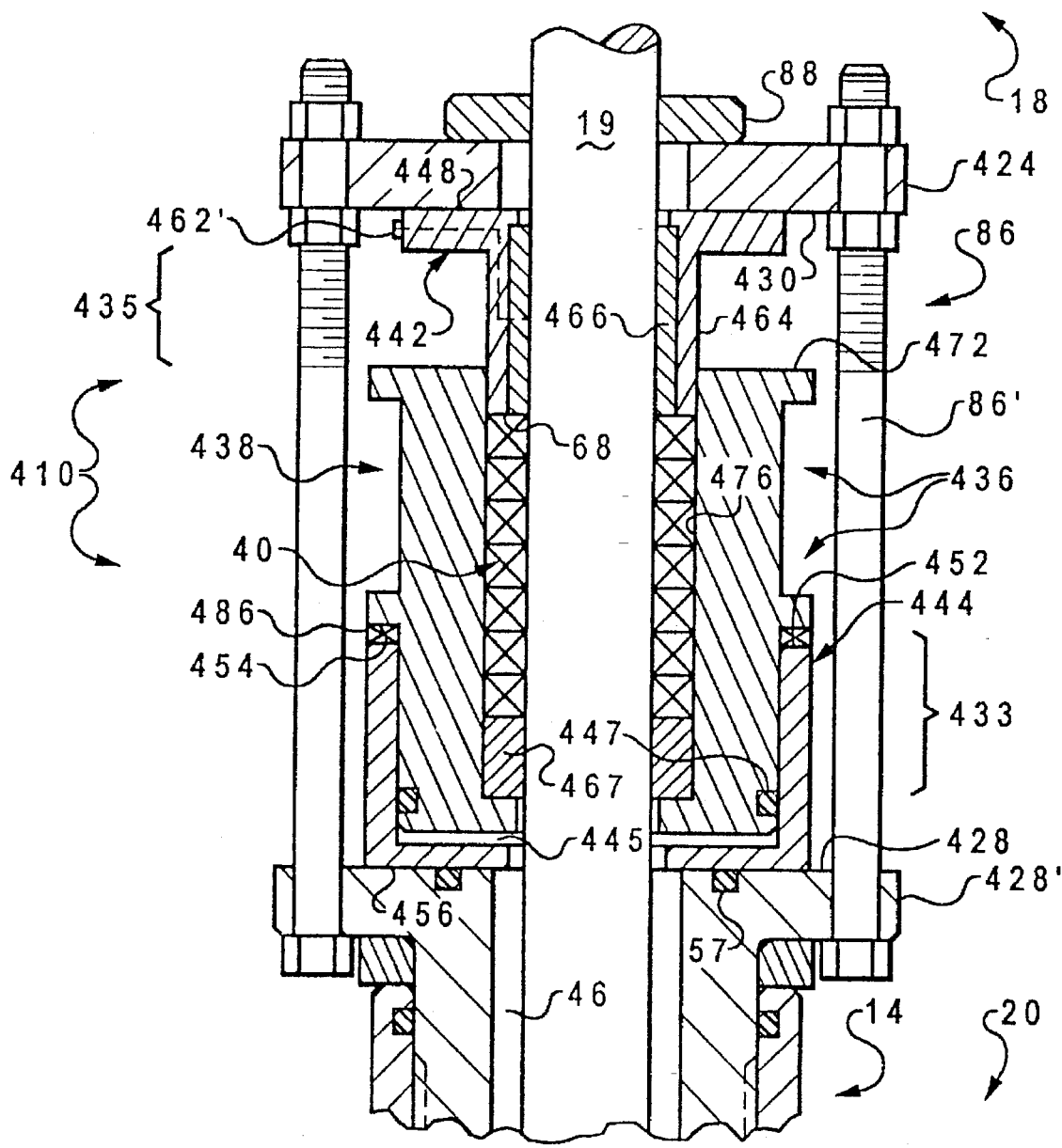
Figure 6:
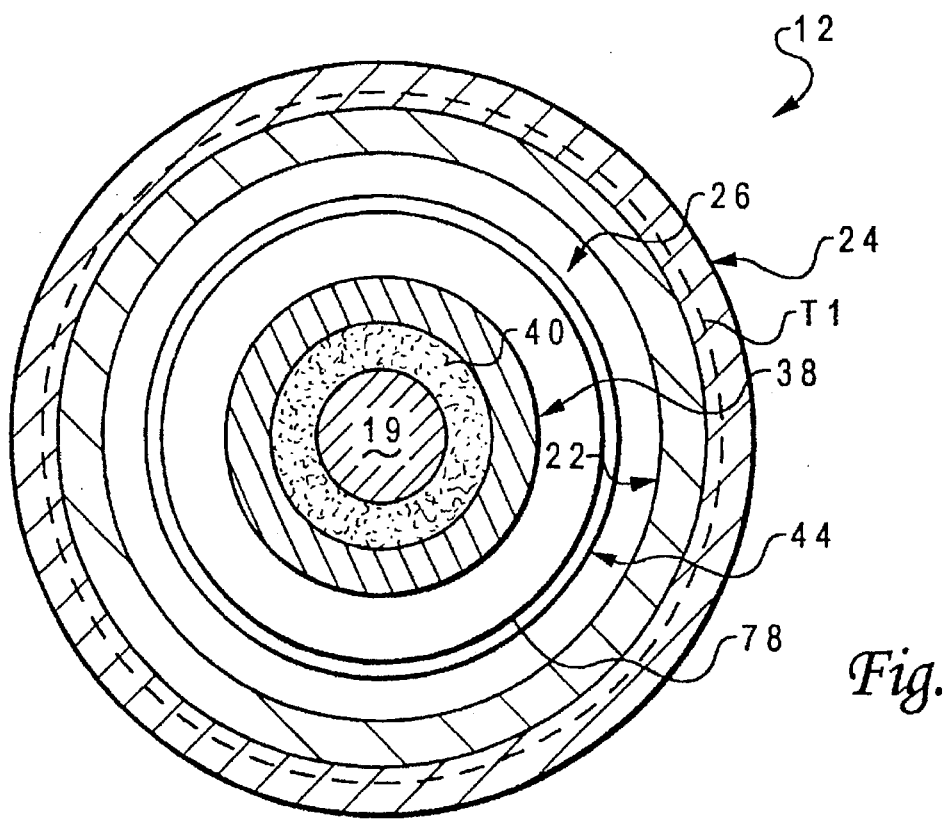
Figure 7:
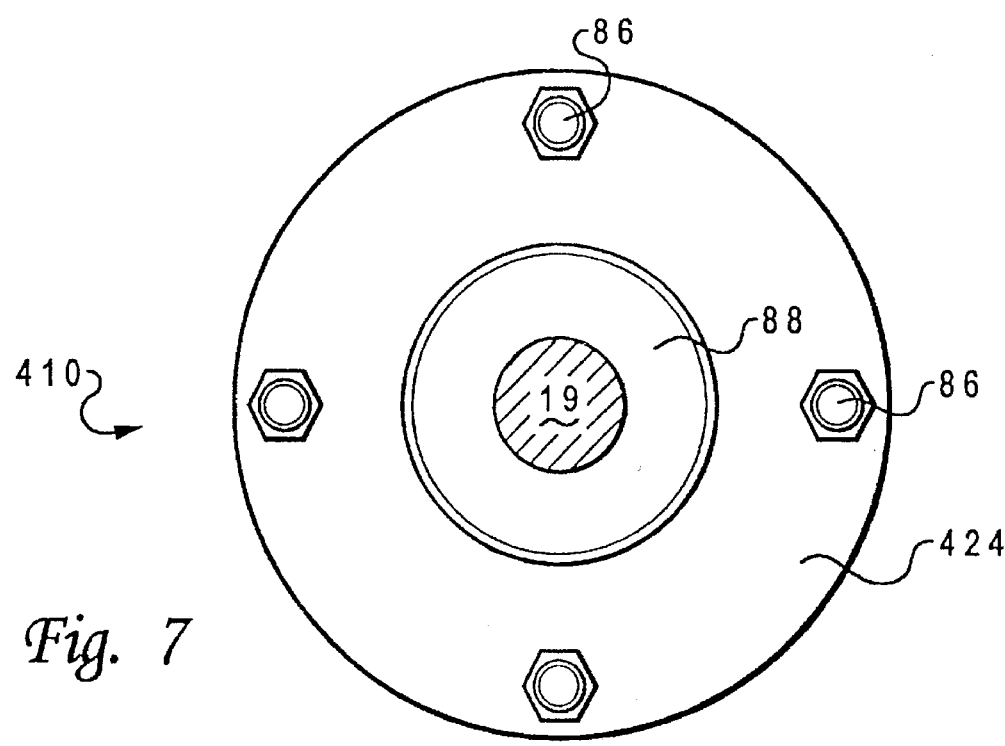

FIG. 5 is a longitudinal, cross-sectional, side view of a fifth embodiment of a stuffing box of this invention;

FIG. 6 is a horizontal cross-sectional, side view illustrating details of the first through fifth embodiment of a stuffing box of this invention; and, FIG. 7 is a top plan view of FIG. 5, with some parts being removed therefrom.

DETAILED DESCRIPTION OF THE PREFERRED EMBODIMENT

Figure 1:
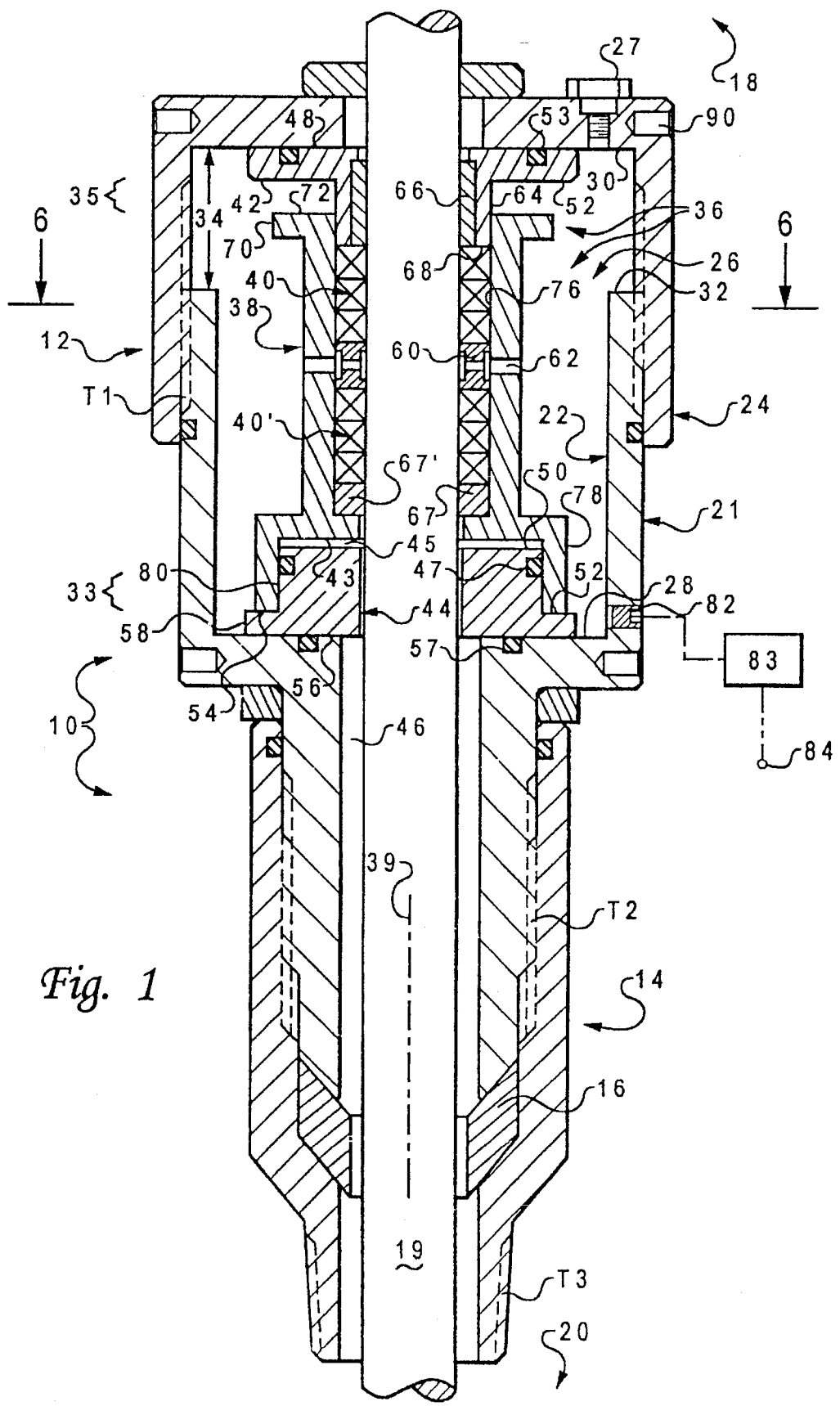
FIG. 1 is a longitudinal, part cross-sectional, side view showing a preferred embodiment of a stuffing box and packer apparatus of this invention, with some parts thereof being removed therefrom.

FIG. 1 discloses the combination 10 of a self-aligning stuffing box 12 and a wellhead adaptor 14, made in accordance with the present invention. The improved stuffing box 12 is supported by the wellhead adaptor 14. The wellhead adaptor 14 also serves as a pack-off for containing the well fluids when it is desired to work on the stuffing box 12. A resilient pack-off 16 is made of elastomeric material and arranged within the adaptor 14 for reasons that are more fully set forth in my copending patents.

Throughout the figures of the drawings, wherever it is possible or logical to do so, like or similar numerals usually will be used to indicate like or similar elements.

In FIG. 1, numeral 18 indicates the location of a pumpjack unit (shown diagrammatically in FIG. 4) which reciprocates a polished rod 19, which in turn reciprocates a downhole pump at 20 (not shown) in the usual manner. The improved stuffing box 12 preferably is of annular configuration and includes a main body 21 having an upwardly directed circumferentially extending sidewall 22 that removably receives a closure member 24 thereon, and thereby forms a chamber 26 therewithin. A filler plug 27 is included to enhance the operation of the stuffing box 12.

The chamber 26 has a floor 28 opposed to and confronting a top wall surface or roof 30 of the closure member 24, which preferably is sealingly received in an adjustable manner respective to the upper terminal end 32 of the main body 21, preferably leaving operating space 34 between the confronting surfaces 30 and 32, respectively, of the roof and upper terminal end, respectively. Note operating spaces 33 and 35 also are provided, and it is preferred that operating space 33 is greater respective to the operating space 35 as will be more fully described later on herein.

In FIG. 1, together with other figures of the drawings, the arrows at numeral 36 indicate a seal assembly, made in accordance with this invention, and which is comprised of a plurality of coacting parts that includes a seal holder 38 within which a seal pack or seal means 40 and 40' is housed, an upper seal pusher and fixture 42, and a lower seal compression piston and fixture 44. The lower seal fixture that forms the compression piston 44 is opposed to the upper seal fixture that forms the upper seal pusher 42, with the seal pack 40, 40', and the seal holder 38 being interposed therebetween. The seal pack 40, 40' can take on a number of different forms as will be more fully discussed later on herein. The upper seal pusher 42 and lower compression piston 44 reciprocatingly receive opposed marginal ends of the seal holder 38 and thereby force the opposed ends of the seal pack 40, 40' to move towards one another to thereby compress the seal means therebetween as the pusher and piston move axially towards one another.

It is noted that the polished rod 19 forms an annulus 46 respective to the main body 21, and that an axial centerline 39 defines the longitudinal central axis of the rod 40 and seal assembly 38, which is not necessarily the axial centerline of the main body 21, as will be more fully appreciated later on herein. An annular compression or variable chamber 45 communicates with tubing annulus 46 and thereby effects an upward or uphole force on lower face 43 of the variable chamber 45 formed on the lower marginal end of the seal holder 38. Other arrangements of the variable chamber 45 are set forth in other embodiments of the invention.

The axially aligned upper annular fixture 42 has a seal pusher 64 thereon, and the lower annular fixture 44 has a compression piston 80 thereon. The opposed fixtures, 42 and 44, respectively, have the illustrated upper and lower faces 48 and 56 thereof, respectively, mounted in opposition respective to one another. The compression piston of fixture 44 terminates in a circumferentially extending shoulder 52 that abuttingly engages the lower circumferentially extending terminal edge 54 of the seal pack holder 38. Hence, the illustrated face 56 that is formed on an outwardly directed flange 58 of fixture 44 also provides a stop means against which the lower terminal end 54 of the seal holder 38 abuttingly engages.

The seal holder 38, seal pack 40, 40', upper seal pusher 64 of fixture 42, and lower compression piston 80 of fixture 44, are axially aligned respective to one another and to the sucker rod 19. The seal pack 40, 40' includes upper and lower seal elements that are separated by a porous annular oil ring 60. The oil ring communicates with the lubrication chamber 26 by means of a plurality of radial ports 62, in the illustrated manner of FIG. 1, for example only.

Seal means 57 is placed in the floor 28 and sealingly engages the confronting face 56 of the outwardly directed flange 58 of fixture 44 for support of the lower end 78 of seal holder 38 of seal assembly 36. Hence, the compression piston of fixture 44 also forms lower face 56 that is slidably supported for lateral or radial sealed movement respective to the floor 28 of the main body 21.

O-ring grooves at 53 and 57 have the illustrated O-rings received therein and thereby prevent leakage of lubricant and well fluid thereacross. Other types of seals can be employed at 53 and 57.

The pair of seal packs at 40 and 40' can be comprised of a plurality of commercially available split pressure seals at upper seal pack 40, and a plurality of split compression seals at lower seal pack 40', or vice versa. Alternatively, the seals can be continuous seals, but as a practical matter, need to be split.

One example of suitable seal elements that can be used in the pressure set upper seal pack is a three piece pack of split seals, part number JW 830-24, available from James Walker & Co. Ltd. This seal is hydraulically compressed and preferably is used in the illustrated manner such as shown at 140, 140' in FIG. 2, for example.

One example of suitable seal elements that can be used in the compression set lower seal pack at 40' of FIG. 1 is a multi-piece pack made of preformed, or rope type packing, part number PE1000, available from Palmetto Inc., which has the following dimensions: 1.5 inches×2.25 inches×⅜ inches. This seal is intended to be compressed and is therefore designed to be used in a variable depth housing such as shown at 40, 40' in FIG. 1, for example. The upper seal fixture and pusher 42 include annular seal pusher 64 which telescopes into the upper interior of the seal holder. Members 66 and 67 are rod guides or bushings which center the rod respective to the seal assembly and bear against opposed ends of the seal pack. The lower bushing 67 is an annular split ring and serves as a pusher and an ejector.

The operating distance 33 is greater than the operating distance 35, so that the seal pusher 64 and the piston 80 of the lower fixture 44 are always properly engaged with the seal holder 38.

The differential in the tubing pressure and ambient forces the piston part of the lower fixture in a downhole direction while expansion of the variable chamber forces the entire seal holder in an up-hole direction, thus engaging the seal pusher of the upper fixture and thereby compressing the seals contained within the seal pack.

Figure 2:
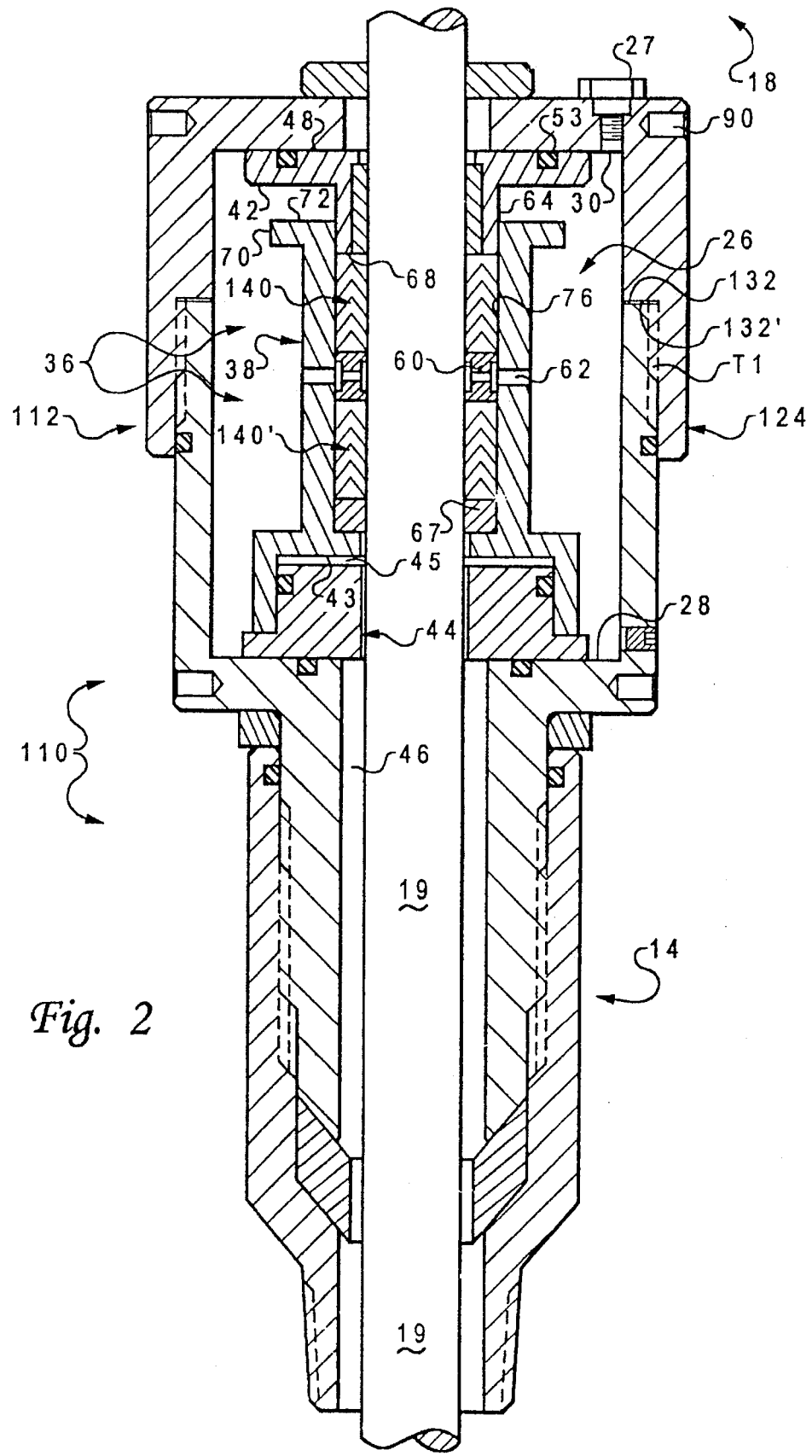
FIG. 2 is a longitudinal, cross-sectional, side view that sets forth the second embodiment of a stuffing box and packer apparatus of this invention, with some parts thereof being removed therefrom.

FIG. 2 of the drawings discloses a seal assembly 36 within which there is received upper and lower pressure set seals, with the seal holder 38 thereof being arranged for axial movement, as shown. The seal packs 140, 140' are both illustrated as pressure set seals.

Figure 3:
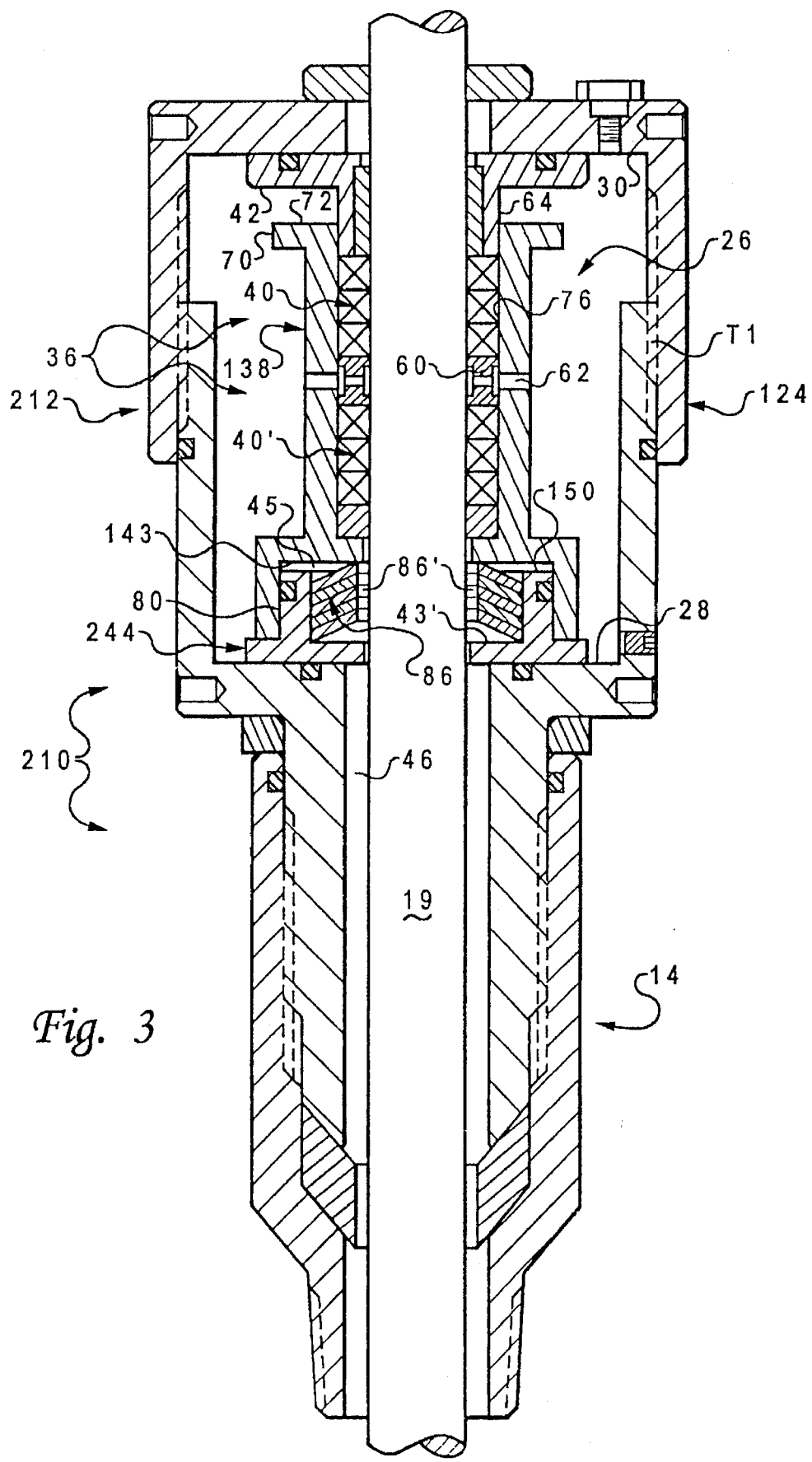
FIG. 3 is a longitudinal, cross-sectional, side view presenting the third embodiment of a stuffing box according to this invention, with some parts being removed therefrom.

The lube ring 60 of FIGS. 1–3 is a porous bushing of annular configuration and has opposed centrally located concentric faces formed thereon for receiving the confronting faces of he pair of seal packs 40 and 40' seated thereagainst.

In FIGS. 1, 2 and 3, the lube bushing 60 is apertured to form a plurality of radial lube ports which form a suitable flow path for lubricant to flow from lube chamber 26 onto the pair of seal packs 40 and 40' of the seal holder 38, thereby providing lubricant at the interface formed between the polished rod 19 and the illustrated seal packs 40 and 40'.

In the embodiments of the invention seen in the figures of the drawings, and in particular FIG. 3, an annular variable chamber 45 is provided between the lower end of member 38 and the compression piston 80 of lower fixture 244 by increasing the volume of the illustrated variable chamber 45. A plurality of resilient members 86 are stored within the chamber 45 to springly force the members 138, 244 apart. The resilient members 86 may be a plurality of commercially available annular wave springs 86', or a stack of Bellville (TM) washers, which can be interposed between faces 143 and 150 of coacting members 138 and 244, whereby member 138 is continually urged away from member 244. Accordingly, moving the closure member or cap 24 toward the floor 28 (tightening the cap 24), forces face 42 axially towards face 72. This action telescopes member 64 further into member 138, thereby further compressing the seal pack 40, 40' which changes the compressive force applied thereto, and thereby changing the sealed operation condition thereof. This action also stores energy within resilient member 86.

In the figures of the drawings, and in particular FIGS. 1, 2, 3 and 4, threaded coacting surfaces at T1 allow the closure member 24 to force members 42, 38 towards one another, thereby changing the compressive forces effected within the seal assembly, and loading or storing energy within the springs 86'. This action also forces members 42 and 44 towards one another. Threaded coacting surfaces at T2 allow the coacting members 14 and 21 (FIG. 1) to move towards one another in order to change the compressive forces exerted on the packer device 16.

Figure 4:
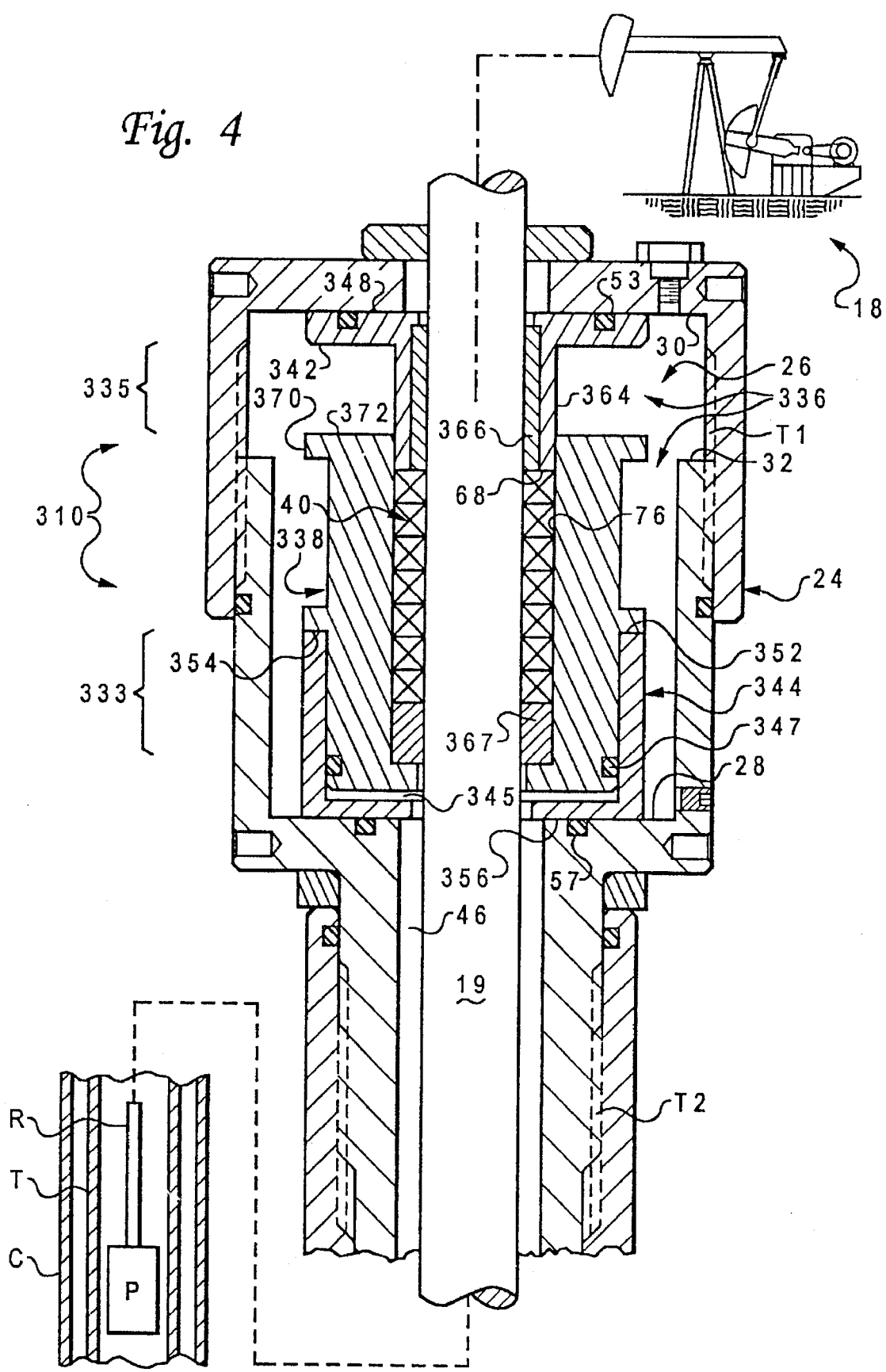
FIG. 4 is a longitudinal, cross-sectional, side view disclosing the fourth embodiment of a stuffing box of this invention, with some parts being removed therefrom.

FIG. 4 is similar to FIGS. 1, 2, and 3 and additionally includes an alternate arrangement of the cylinder and piston that forms the variable chamber at a the lower end of the seal assembly. As seen illustrated at 338, 338' and 344, the lower fixture 344 has a cylinder 344' formed within the lower end thereof which reciprocatingly receives the lower marginal end of seal holder 338. The seal holder 338 has a lower terminal end 338' that is in the form of a piston. Compression or variable chamber 345 communicates with tubing annulus 46 to force member 338 to reciprocate uphole; whereupon the seal pack 40 is set by a force that is proportional to the tubing pressure at 46 and 345. O-ring groove 57 seals the interface between the confronting adjacent faces 356 and floor 28. This arrangement of the seal assembly 336 maintains a constant upward force on the seal pack 40 that is proportional to the hydraulic force effected at 345.

The embodiment of FIG. 4 provides a long stroke of the piston and cylinder of the lower fixture with less elongation of the entire seal assembly as compared to the embodiments of FIGS. 1–3.

Still looking at FIG. 4, it is seen that the upper fixture 342 of seal assembly 336 is reciprocatingly received within the upper inner marginal end of seal holder 338 and thereby forms a seal receiving variable cavity within which a plurality of compression set type seal packs 40 are suitably received. Note that it is unnecessary to use an O-ring seal between the two reciprocating surfaces formed between members 364 and 338 because the compression type seal pack eliminates the need therefor. The opposed upper seal pusher 364 and lower compression piston 338' may be forced towards one another by adjusting the closure means 24 downwardly whereupon the roof 30 and floor 28 are urged towards one another which results in change of the spacing at 335. When members 354 and 352 abut one another, further movsement results in compression of the seals contained within the seal pack 40.

The opposed faces 348 and 356, respectively, of the upper and lower fixtures, respectively, are arranged to directly contact the roof and floor O-ring seals 53, 57, respectively, as they are urged thereagainst by the centrally located compressed seal pack when the closure means 24 is properly spaced out and the threads T1 thereof are properly torqued.

In the embodiment of the invention set forth in FIGS. 5 and 7 of the drawing, the self aligning, pressure set stuffing box 410 is mounted in the before described manner to the upper end of a production string with the polished rod extending through a passageway extending therethrough. The main body is in the form of an open cage 86 that includes upper roof member 424 spaced from lower floor member 428' with the seal pack 40 of the seal assembly 438 being compressed therebetween. This compression of the seal pack is resisted by the illustrated circle of tension bolts 86'. The upper fixture 442 includes a seal pusher 464 formed thereon for engaging the seal pack 40 of the seal holder 438. The upper fixture has an opposed face 448 that slidably bears against confronting face 430 of roof member 424. There is no seal required at interface 430, 448.

The lower marginal end of the seal holder is formed into a piston which is reciprocatingly received within the cylinder of the lower fixture, thereby forming the variable chamber 445.

The lower fixture 444, in conjunction with the seal holder, forms the variable chamber 445 and is similar in many respects to the foregoing different embodiments of the invention. The confronting face 456 of the lower fixture 444 slidably bears against confronting face 428 of the floor member 428'. There is an O-Ring seal 57 required at interface 428, 456 to prevent loss of well fluid therethrough.

The lower fixture includes a compression cylinder which reciprocatingly receives the lower marginal end of the seal holder 438 therein, while seal 447 prevents outflow of well fluid from the production tubing.

Tightening of the tension bolts 86 increases the force that faces 448 and 456, respectively, apply to the opposed roof and floor. The tubing pressure effected at variable chamber 445 determines the uphole thrust that the seal compression piston exerts on the downhole end of the seal pack, which can be deformed according to the applied compression force, within the limits of travel determined by the spaced distance measured between confronting faces 442 and 472 as the pusher 464 reciprocates within the upper marginal end of the seal holder 438, and thus against the uppermost end of the seal pack.

In each of the embodiments of the invention, the area of the downhole side of the seal holder that is exposed to the tubing pressure, less the area of the uphole side of the seal pusher that is exposed to ambient, determines the uphole thrust that is imposed on the lower end of the seal pack by member 467, or between the terminal ends of the members 68 and 467.

In FIG. 5, the seal assembly 436 is lubricated at the lub port 462'. A wave spring 486 can be incorporated between the faces 452, 454 of the seal holder piston member and the upper edge of the lower fixture 444, for reasons set forth in conjunction with the spring 86 of FIG. 3.

Those skilled in the art, having digested all of this disclosure, should now appreciate that there is a "sweet point" related to the tension value of the tie rods 86 which is a compromise between the sealing pressure of the O-ring at floor 428, the friction of the confronting faces at 430, 448, and the force exerted against the seal pack at 68, 467. Further, where the well pressure is high, the separation at 452 and 454 can be observed as the tie bar tension is increased and the wave spring compressed, and, with operating experience, the distance of the separation can be used as a guide for the optimum tension values.

It is contemplated that those skilled in the art, having digested this disclosure, will now be able to utilize the various teachings set forth in conjunction with the several different embodiments herein to their great advantage in fabricating a stuffing box that embraces selected features found herein while remaining within the scope of this invention.

In the figures of the drawings, and in particularly FIG. 2, wherein both the upper and lower seal packs 140 and 140' comprise pressure set seals, those skilled in the art will appreciate that as the rod 19 is reciprocated within the stuffing box 110, ambient pressure is effected against the upper face 48 of the uppermost seal means 140 of the pair of seal packs, while the wellbore pressure is effected against the lowermost face 43 of the seal holder that confronts the lower compression piston of fixture 44. The pressure set seals contained within each of the seal packs preferably is always arranged such that the lips thereon are pointed down and thereby wipe the lube oil from the rod surface on the upstroke, and provide lubrication for the rod on the downstroke. Any residual lube oil remaining at the end of the upstroke provides additional lubrication during the downstroke. This action results in long seal life, but it can also often require an excessive amount of lubricant.

Many unforeseen advantages are realized when a pressure set upper seal pack is employed in conjunction with a compression set lower seal pack made in accordance with the present invention. In this instance the lube oil will not skid or hydroplane across the sealed interface between the rod or shaft and the seal, because the oil is wiped from the rod surface by the compressive force of the seal on both the upstroke and downstroke, and as long as the proper compressive forces are effected across the seal faces of the lower seal pack, the lube chamber will be slowly rather than rapidly depleted, the lower seal will enjoy an unusually long life, and the upper seal pack will always be available when the lower seal pack does finally fail.

Various embodiments of the invention often will be employed in conjunction with a pump or motor having a rotatable shaft which does not displace the oil in the above described manner. Moreover, where the longitudinal axis of the shaft is arranged horizontally, the durable life of the lower seal pack is increased due to the availability of most of the lube oil supply contained in the lube oil chamber. In this instance, failure of the seals is not as likely to occur prior to depletion of the entire available lube oil supply, so the low level may be detected in time to save the seal integrity. In any event, this described seal structure or assembly of this invention is a great advantage over other known seal structures.

In operation, as the apparatus of the invention is assembled, the seal assembly isolates the oil reservoir 26 from ambient and from the tubing, leaving sufficient tolerance between various interfaces thereof and for the seal assembly to be moved towards and away from the axial centerline of the borehole as may be required to achieve proper alignment of the coacting parts, while at the same time seals 40 and 40', respectively, sealingly engage the adjacent roof and floor surfaces 30, and 28, respectively.

Annulus 46 is in communication with the upper end of the production tubing and accordingly there is usually a pressure in excess of atmospheric effected within variable chamber 45 which pushes the lower face 43 of the seal holder 38 uphole. This places a positive pressure on the lower face (at 67) of the seal pack 40' as the seal holder 38 urges the seal pack uphole against shoulder 68 in proportion to the pressure drop thereacross. Should the lower seal pack 40' commence failure, there will be leakage through the damaged seal pack, through lube passageway 62, into the lube oil chamber 26, thereby elevating the pressure within the chamber 26. This elevated pressure can be sensed by sensor means 83 connected to chamber 26 at connection 82 to provide a signal at 84. The resultant signal can be connected to circuitry (see 100 of my copending patent application) which in turn is connected to a controller device to shut off the pumpjack motor. The oil reservoir 26 is filled by removing the filler plug 27, after having isolated the chamber 26 from the tubing pressure.

The seal assembly 36 is easily replaced by first setting the pack-off or packer element 16. This is achieved by screwing the main body 21 respective to the adaptor 14 to cause the shoulders of the adaptor 14 and lower part of main body 21 to move towards one another as the threads at T2 are made up. This action causes the illustrated cones to be moved axially toward one another, thereby compressing the elastomeric material of pack-off 16 between the cones and against the polished rod 19 to seal or pack-off the tubing pressure from annulus 46. Next, the closure member 24 is engaged with a suitable wrench at wrench detents 90 and unthreaded at T1 whereupon the closure member can be lifted free of the main body. The entire seal assembly can be removed from the interior of the main body by sliding it up the polished rod. At this time, lubricant from the oil reservoir will gravitate into the annular area 46 located above the pack-off.

Next the seal assembly 36 is parted to expose the seal holder 38, so that the individual seals of the seal pack 40, 40' can be replaced after removing the old split seals therefrom.

It is convenient and sometime necessary to remove the seal assembly 36 from the polished rod 19 in order to replace the various O-rings, or to replace the oil ring 60, unless it is split. When split, the oil ring is easily deformed or twisted and removed from the polished rod.

Next, a new lower seal pack is placed about the polished rod and moved into position within the seal chamber of the seal holder, which then is moved down into position to be received about the member 44. Next, the compression piston and seal holder are moved into the illustrated position of FIG. 1, and then the upper seal fixture 42 and upper seal pack 40 are moved into the illustrated position of FIG. 1, whereupon threads T1 of the closure member 24 can be made up. The oil reservoir is topped off with clean lubricant after which chamber 26 is sealed and the the main body is rotated back into the operative configuration, thereby releasing the packoff 16 from the polished rod, as its memory returns it to normal configuration. Now the pumpjack unit resumes operation with a new seal pack in place.

The figures of the drawings disclose other embodiments of the invention made especially for accommodating either of rotating and reciprocating shafts, whereas some of the embodiments set forth in the figures of the drawings preferably are for use in conjunction with reciprocating shafts. On the other hand, where deemed desirable, any of the embodiments disclosed in FIGS. 1-7 can advantageously be used in conjunction with either reciprocatory and rotational shaft motion.

The new combination of the novel stuffing box, packer apparatus, and pressure set seal packs provides new and unobvious and patentable features that reduce the cost of producing an oil well with a pump jack unit.

I claim:

1. A self aligning stuffing box for a pumpjack unit of the type adapted to reciprocatingly receive a polished rod extending therethrough and downhole into a borehole; said stuffing box, comprising:

a main body having an upper end opposed to a lower end, adaptor means at said lower end by which said stuffing box can be mounted respective to said borehole; said main body having a floor, a closure means at said upper end of said main body that forms a roof; a longitudinal passageway extending through said main body through which said polished rod can extend;

a seal assembly having inner and outer surfaces and upper and lower faces, with said upper face of said seal assembly confronting said roof and said lower face of said seal assembly confronting said floor; a seal pack axially aligned with said polished rod and forming part of said inner surface of said seal assembly for sealingly engaging said polished rod;

said upper face of said seal assembly slidably engaging said roof; and, said lower face of said seal assembly slidably engaging said floor; and pressure responsive means for compressing said seal pack in proportion to fluid pressure measured at a lower end of said longitudinal passageway;

and means for moving said roof and said floor towards one another to thereby move said upper face and said lower face of said seal assembly towards one another, to thereby compress said seal pack within said seal assembly;

whereby, said seal assembly can move laterally of said longitudinal passageway while slidably engaging said roof and said floor and thereby align said seal assembly with said polished rod.

2. The stuffing box of claim 1 wherein said seal assembly includes a seal holder within which said seal pack is mounted; said pressure responsive means includes an upper seal pusher and a lower piston, respectively, reciprocatingly received respective to opposed ends of said seal holder with said seal pack being compressed therebetween.

3. The stuffing box of claim 1 and further including a seal holder within said seal assembly, said seal holder having an upper end and a lower end, said seal assembly including a seal pusher having one end that forms said upper face of said seal assembly and another end which reciprocates within said upper end of said seal holder; and, a lower seal piston having one end that forms said lower face of said seal assembly and another end that is reciprocatingly received with respect to said lower end of said seal holder and forms a variable chamber that is in communication with an annulus of said borehole, whereby a pressure differential is effected across said seal pack of said seal holder which is proportional to a pressure differential between ambient pressure and pressure in said annulus.

4. The stuffing box of claim 1 wherein said seal assembly comprises a seal holder, axially movable upper and lower members reciprocatingly received by opposed ends of said seal holder, said axially movable upper and lower members are spaced apart by said seal pack, with said seal pack being compressed in response to a pressure differential effected across said axially movable upper and lower members.

5. The stuffing box of claim 1 wherein said adaptor means is connected to a tubing string which extends into said borehole; said seal assembly includes a seal holder within which said seal pack is captured, said seal holder having an upper end and a lower end, an upper fixture by which said upper end of said seal holder is mounted for movement respective to said roof; and a lower fixture by which said lower end of said seal holder is mounted for movement respective to said floor, said lower fixture and said seal holder having a variable chamber formed therewithin which when subjected to a pressure differential from said tubing moves said lower fixture axially and changes the sealed operating condition of said seal pack.

6. The stuffing box of claim 5 wherein said seal pack is comprised of at least one seal element that is pressure set;

and said stuffing box includes means associated with said seal pack by which adjustment of said upper fixture is effected by moving said roof and said floor towards one another; whereby, changes can be effected in the sealed operating condition of said seal pack without disassembly of said stuffing box.

7. An improved stuffing box of the type that can be connected to a tubing, and having a shaft received therethrough in a sealed manner therewithin and forms a tubing annulus therewith, comprising:

said box having a longitudinal passageway extending therethrough through which said shaft can be received for either of rotational and reciprocating movement;

said box includes means forming an upwardly opening enclosure within said box, said box has an upper end opposed to a lower end with said enclosure being spaced radially from said longitudinal passageway; a closure member affixed to said upper end of said means forming said enclosure;

a seal assembly having an outer wall surface that forms an inner wall of a chamber; said closure member has a lower face that forms a roof of said chamber; said seal assembly includes a seal holder and terminates in opposed upper and lower fixtures for supporting said seal holder; said upper fixture slidably engages said roof of said closure member and said lower fixture slidably engages a floor of said means forming said enclosure;

an axial passageway extending longitudinally through said seal assembly in parallel relationship respective to said longitudinal passageway of said box; a seal pack including seal elements mounted within said seal holder for sealingly engaging said shaft;

said seal assembly is received within said chamber and moves radially of said longitudinal passageway to thereby align said seal pack with said shaft; said seal holder includes a lower end which reciprocatingly receives an upper end of said lower fixture to form a variable chamber therebetween, said variable chamber being connected to said tubing annulus whereby a pressure differential across said seal assembly effects compressive forces on said seal pack.

8. The stuffing box of claim 7 wherein said seal pack includes an upper seal pack and a lower seal pack spaced from one another by an annular oil ring by which lubricating oil can be transferred to each of said seal packs; each of said seal packs is comprised of at least one seal element that is either of a compression set seal element and a pressure set seal element;

and means associated with said upper seal pack and said lower seal pack by which a sealed operating condition of said at least one seal element is changed by adjustment of either of said upper fixture and said lower fixture; whereby, changes can be effected in said sealed operating condition of said seal pack by changes in fluid pressure in said tubing and by changes in the relative position of said closure member.

9. The stuffing box of claim 7 wherein said seal pack includes a lower seal pack and an upper seal pack;

said seal assembly includes an upper seal pusher which forms part of said upper fixture by which one end of said seal holder is reciprocatingly captured; and, a lower seal piston which forms part of said lower fixture by which another end of said seal holder is reciprocatingly captured, and with there being a variable chamber formed between said seal holder and said lower seal piston; said variable chamber being connected to a pressure source which provides a pressure drop across said seal holder and thereby effects adjustment of a sealed operating condition of said seal assembly.

10. The stuffing box of claim 7 wherein said seal pack comprises upper and lower spaced annular resilient seal elements having a porous oiling member mounted therebetween, and passageway means connecting said porous oiling member for lubricating said seal pack and said shaft;

said seal assembly includes an upper seal pusher that is part of said upper fixture which supports an upper marginal end of said seal holder;

means forming a variable chamber between said lower fixture and said seal holder which changes a sealed operating condition of said seal assembly proportional to a change in pressure in said tubing.

11. The stuffing box of claim 7 wherein said seal assembly includes an upper seal pusher that is part of said upper fixture and which receives an upper end of said seal holder; and, a lower seal piston that is part of said lower fixture and which reciprocatingly receives a lower end of said seal holder;

a variable chamber is formed between said lower seal piston and said seal holder, and passageway means by which tubing pressure flows from said tubing annulus to said variable chamber to compress said seal pack and thereby compress said seal elements thereof respective to said polished rod.

12. The stuffing box of claim 7 wherein said chamber includes a lubrication chamber about said seal assembly;

and, circuit means including a pressure actuated switch means connected to measure the pressure in said lubrication chamber and for rendering movement of said shaft inoperative upon the pressure measured within said lubrication chamber reaching a predetermined magnitude.

13. The stuffing box of claim 7 wherein said shaft is reciprocatingly connected to a pump jack, said seal assembly is arranged for radial movement within said chamber in a manner such that said longitudinal passageway can be moved eccentrically in any radial direction within a plane that lays perpendicular to said shaft to thereby accommodate misalignment between a pumpjack horsehead and a vertical axis of a borehole;

said seal pack comprises upper and lower spaced annular resilient seal elements, and passageway means interconnecting said seal pack and said chamber for lubricating said seal assembly and said shaft;

said upper fixture includes an upper seal pusher by which an upper end of said seal holder is mounted thereto, and said lower fixture includes a lower seal piston by which a lower end of said seal holder is mounted;

a variable chamber formed between said lower seal piston and said seal holder, passageway means by which pressure fluid flows from said tubing annulus to said variable chamber to compress said seal pack and thereby compress said seal elements respective to said shaft.

14. A stuffing box adapted for use with a pumpjack unit of the type having a polished rod reciprocatingly received through said stuffing box in a sealed manner therewithin; said stuffing box being attached to an upper end of a production tubing string having a pressure differential between a tubing annulus and ambient; the improvement comprising:

a longitudinal passageway extending through said stuffing box through which said polished rod can be reciprocatingly received; said stuffing box has a roof spaced from a floor, with there being a seal assembly received therebetween; said seal assembly being of a size to be received for radial movement respective to said passageway; said seal assembly includes a seal holder, and an upper seal fixture opposed to a lower seal fixture; said seal holder having a seal pack therein for sealingly receiving said polished rod therethrough;

said upper seal fixture has opposed ends with a seal pusher at one end for engaging said seal pack and a face at the other end for slidably engaging said roof;

said seal holder having opposed ends, with one end being supported by said seal pusher with said seal pusher bearing against the seal pack; the other end of said seal holder being supported by said lower seal fixture;

said lower seal fixture has opposed ends with there being a face at one end of said lower seal fixture for slidably engaging said floor and a variable chamber at the other end of said lower seal fixture which supports said other end of said seal holder;

said seal assembly is received between said roof and said floor with said fixtures, respectively, slidably engaging said roof and said floor, respectively;

whereby, said seal assembly can move radially of said passageway and thereby align said seal assembly with said polished rod while a pressure differential compresses said seal pack with a force proportional to fluid pressure in said tubing.

15. The improvement of claim 14 wherein said seal pusher is reciprocatingly received within said upper end of said seal holder;

and means associated with said upper seal fixture and said lower seal fixture by which a sealed operating condition of said seal pack is changed by adjustment of a distance between said roof and said floor; whereby, changes can be effected in a sealed operating condition of said seal pack without disassembly of said stuffing box.

16. The improvement of claim 14 wherein said variable chamber is formed between said lower seal fixture and said other end of said seal holder; and further including spring means in said variable chamber urging said lower seal fixture and said seal holder apart; whereby said seal pack is compressed by the action of said spring means, and also by the action of fluid pressure in said tubing.

17. The improvement of claim 14 wherein said seal pack comprises upper and lower spaced annular resilient seal members having a porous annular oiling spacer member axially received therebetween, and passageway means connected to the porous oiling spacer member for lubricating the seals of the seal assembly and the polished rod.

18. The improvement of claim 14 and further including an upper seal pack that is comprised of at least one seal element that is either of pressure and compression set, and a lower seal pack that is comprised of at least one seal element that is compression set.

19. The improvement of claim 14 wherein a lubrication chamber encloses said seal assembly and has a pressure actuated sensor means associated therewith and connected to circuit means for deenergizing the operation of the pumpjack when the pressure within the lubrication chamber reaches a predetermined value.

* * * * *